United States Patent
Diebold et al.

(10) Patent No.: US 10,518,301 B1
(45) Date of Patent: Dec. 31, 2019

(54) ISOLATION ENCLOSURE AND METHOD FOR CONDUCTING HOT WORK

(71) Applicant: SafeZone Safety Systems, L.L.C., Houma, LA (US)

(72) Inventors: Mark Alan Diebold, Houma, LA (US); Benjamin Neil Tobias, Houma, LA (US); Chad Andrew Grand, Baton Rouge, LA (US)

(73) Assignee: SafeZone Safety Systems, L.L.C., Houma, LA (US)

( * ) Notice: Subject to any disclaimer, the term of this patent is extended or adjusted under 35 U.S.C. 154(b) by 488 days.

(21) Appl. No.: 15/381,391

(22) Filed: Dec. 16, 2016

Related U.S. Application Data

(60) Provisional application No. 62/269,720, filed on Dec. 18, 2015.

(51) Int. Cl.
*B08B 15/02* (2006.01)
*B23K 9/16* (2006.01)

(52) U.S. Cl.
CPC .............. *B08B 15/02* (2013.01); *B23K 9/16* (2013.01)

(58) Field of Classification Search
CPC .......... B23K 9/16; B23K 37/006; B08B 15/02
USPC ........................................................ 454/49
See application file for complete search history.

(56) References Cited

U.S. PATENT DOCUMENTS

| | | |
|---|---|---|
| 3,452,764 A | 7/1969 | Bell |
| 3,946,571 A | 3/1976 | Pate et al. |
| 4,068,975 A | 1/1978 | Eskeli |
| 4,249,463 A | 2/1981 | Hornby |
| 4,297,940 A | 11/1981 | Hainline |
| 4,560,873 A | 12/1985 | McGowan et al. |
| 4,742,763 A | 5/1988 | Holter et al. |
| 4,771,929 A | 9/1988 | Bahr et al. |
| 4,968,975 A | 11/1990 | Fritz |
| 5,026,219 A | 6/1991 | Wallace |
| 5,101,604 A | 4/1992 | Wardlaw, III |
| 5,101,710 A * | 4/1992 | Baucom ............... H02B 13/055 454/184 |
| 5,176,566 A | 1/1993 | Crouch |
| 5,497,573 A | 3/1996 | Stadjuhar et al. |

(Continued)

FOREIGN PATENT DOCUMENTS

| | | |
|---|---|---|
| GB | 2311847 A | 10/1997 |
| GB | 2382593 B | 6/2005 |

OTHER PUBLICATIONS

Current Applications of Oil Well Logging Equipment in Hazardous Areas by C.G. Casso, Anadrill Schlumberger, USA, Electrical Safety in Hazardous Environments, Apr. 19-21, 1994, Conference Publication No. 390, © IEE, 1994.

(Continued)

*Primary Examiner* — Kenneth Rinehart
*Assistant Examiner* — Phillip Decker
(74) *Attorney, Agent, or Firm* — Roy Kiesel Ford Doody & North, APLC

(57) ABSTRACT

In the specification and drawings, an isolation enclosure and method for conducting hot work is described and shown with an enclosure; a negative pressure atmosphere within the interior of the enclosure; a hot work apparatus operable outside of and adjacent to the enclosure; and a detector located so as to be capable of detecting the presence of combustible gas within said enclosure. A method of conducting hot work is also described and shown.

4 Claims, 2 Drawing Sheets

(56) References Cited

U.S. PATENT DOCUMENTS

Figure 1:
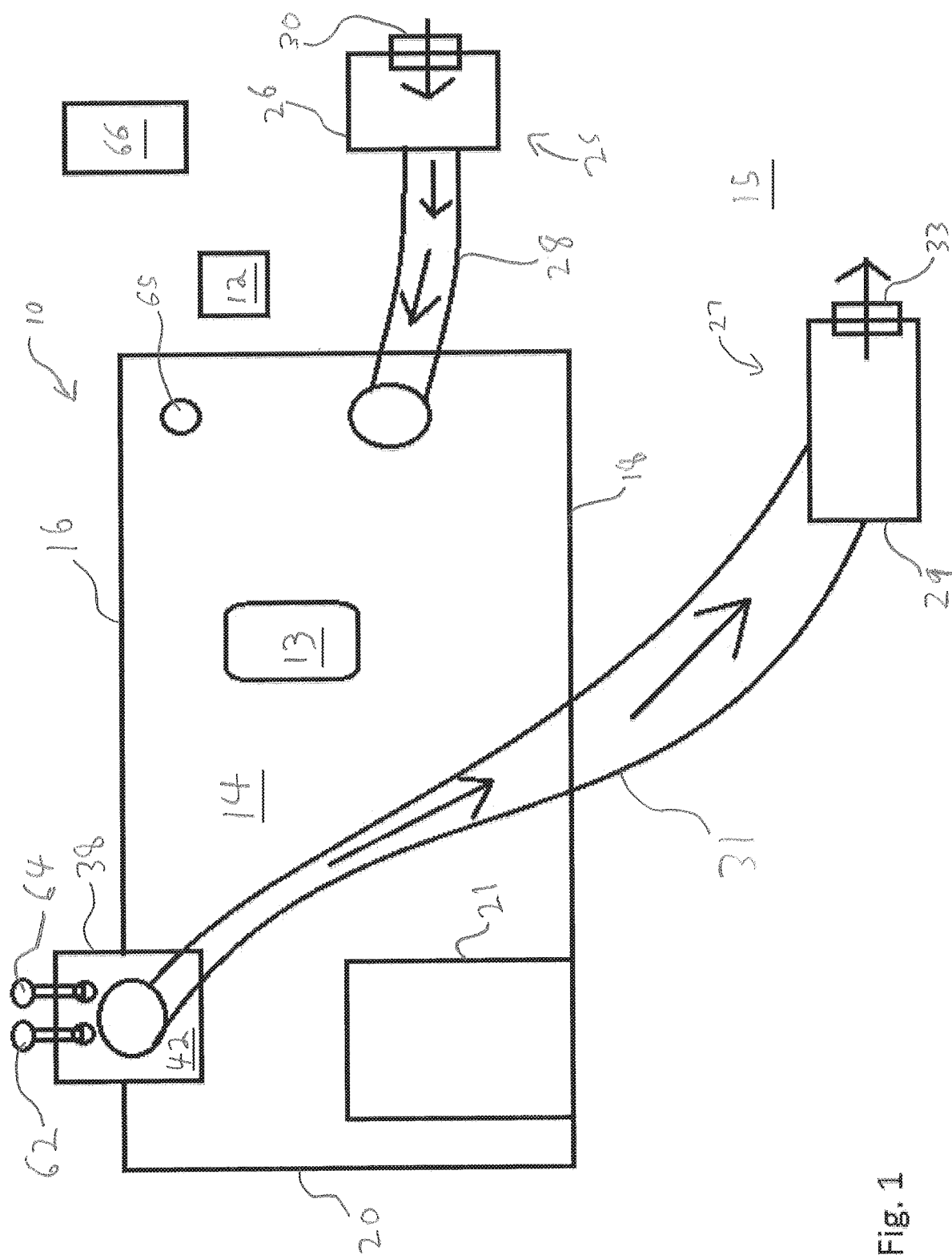

| | | |
|---|---|---|
| 5,550,375 A | 8/1996 | Peters et al. |
| 5,552,775 A | 9/1996 | Harley |
| 5,685,771 A | 11/1997 | Kleppen |
| 5,702,296 A | 12/1997 | Grano |
| 5,725,426 A | 3/1998 | Alvarez |
| 6,060,689 A | 5/2000 | Wilson |
| 6,076,313 A | 6/2000 | Pannell et al. |
| 6,328,775 B1 | 12/2001 | Fuchs |
| 6,402,613 B1 | 6/2002 | Teagle |
| 6,540,603 B1 | 4/2003 | Koskinen |
| 6,701,776 B2 | 3/2004 | Stetter |
| 6,741,181 B2 | 5/2004 | Skaggs |
| 6,783,054 B1 | 8/2004 | Pregeant, Jr. et al. |
| 7,021,165 B2 | 4/2006 | Brunck et al. |
| 7,022,993 B1 | 4/2006 | Williams, II et al. |
| 7,091,848 B2 | 8/2006 | Albarado |
| 7,094,142 B1 | 8/2006 | Maskell |
| 7,193,501 B1 | 3/2007 | Albarado et al. |
| 7,375,643 B2 | 5/2008 | McAward |
| 7,397,361 B2 | 7/2008 | Paulsen |
| 7,456,753 B2 | 11/2008 | Kitagawa et al. |
| 7,504,962 B2 | 3/2009 | Smith |
| 7,518,484 B2 | 4/2009 | Albarado et al. |
| 7,765,072 B2 | 7/2010 | Eiler et al. |
| 8,024,982 B2 | 9/2011 | Pettit et al. |
| 8,436,277 B2 * | 5/2013 | Wardlaw .................. B23K 9/16 219/130.01 |
| 8,947,249 B1 | 2/2015 | Dore et al. |
| 2009/0134995 A1 | 5/2009 | Wardlaw, III |
| 2013/0303066 A1 * | 11/2013 | Waulters .................. F24F 7/007 454/65 |
| 2015/0101396 A1 | 4/2015 | Dore |
| 2015/0111161 A1 | 4/2015 | Dore |
| 2015/0352655 A1 * | 12/2015 | Watters .................... B23K 9/32 700/282 |

OTHER PUBLICATIONS

MMS Production Inspection Form Procedural Handbook (2000).

I.G. Browning. "Welding Hot Work Habitats" Society of Petroleum Engineers (1994).

Bebco Industries, Inc. Custom Metallic Enclosures Division Technical Bulletin-Design Guide & Specifications, CME-DGS-R1.0, Jan. 2000.

Bebco Industries. Inc., Modular Industrial Housing for Equipment & Personnel Brochure, 2004.

Bebco Industries, Inc. Industrial Duty Fiberglass Shelters for Highly Corrosive & Marine Locations ISO Technical Bulletin IDFS-RI.I, Jul. 2004.

Bebco Industries, Inc. Model RDP-24 Remote Mount Dual Blower Building Pressurization Unit, ECU Division Technical Bulletin RDP-24-RI.0, May 1997.

Bebco Industries, Inc. Model WDP-24 Wall Mount Dual Blower Building Pressurization Unit, ECU Division Technical Bulletin WDP-24-RI.0, May 1997.

Bebco Industries, Inc. Models GO & GDSB Gas Detector Sensors, Monitors, Power Supplies & Mounting Brackets, ECU Division Technical Bulletin GDA-RI.0, May 1997.

Kidden Fenwal, AnaLaser, HSSD®-LTT (High Sensitivity Smoke Detection System Laser Technology Type), Jun. 1992, 89.58.2.

* cited by examiner ial Application No. 62/269,720, filed Dec. 18, 2016, which is
ISOLATION ENCLOSURE AND METHOD FOR CONDUCTING HOT WORK

I. CROSS-REFERENCE TO RELATED APPLICATION

This application claims the benefit of U.S. Provisional Application No. 62/269,720, filed Dec. 18, 2016, which is hereby incorporated by reference in its entirety.

II. BACKGROUND

A. Technical Field

An embodiment described herein is an isolation enclosure and method for conducting hot work.

B. Background Art

An embodiment of an apparatus and method for conducting hot work is described in U.S. Pat. No. 8,947,249 to Dore et al., which is hereby incorporated by reference.

III. BRIEF SUMMARY

An embodiment is an isolation enclosure and method for conducting hot work, such as a negative pressure hot work isolation enclosure and process that can enable the safe execution of hot work activities (e.g. cutting, grinding, or welding) to take place outside of the enclosure in locations, without shutting down production, where the potential for the introduction of hydrocarbons or other combustible gases exists. The hot work isolation enclosure can be installed to encapsulate and isolate areas or structures that have the potential to release hydrocarbons, such as well heads, valves, flanges, etc. By doing so the enclosure can create a sealed enclosure around these structures to prevent the introduction of hydrocarbons into potentially sensitive areas, such as areas outside of the enclosure, but adjacent to, near to, or otherwise in the vicinity of the enclosure, where hot work is being conducted or is to be conducted.

In the event that combustible gas is released from a structure within the enclosure that has the potential to release combustible gas, the enclosure can prevent the combustible gas from migrating to an area outside of the enclosure where hot work is being conducted. A negative pressure atmosphere in the enclosure (i.e. an atmosphere within the enclosure that has a pressure that is lower than the atmosphere outside of the enclosure) can further reduce the possibility that combustible gas could escape through the walls of the enclosure (e.g. through holes or tears in the wall or through seams between wall panels) and migrate to the area outside of the enclosure where hot work is being conducted. Also in the event that combustible gas is released from a structure within the enclosure that has the potential to release combustible gas, combustible gas detectors positioned inside and/or outside of the enclosure can detect the combustible gas and cause hot work that is being conducted outside the enclosure to automatically shut down.

The hot work isolation enclosure is designed to create an air-tight seal around any obstructions in the isolation perimeter with enclosure panels that cope around pipework, beams, etc. to contain and seal all areas where the potential for hydrocarbon release exists.

The hot work isolation enclosure can incorporate a monitoring & control system which measures the air quality inside and outside of the enclosure, and initiates automatic shutdown of all hot work components upon the loss of negative pressure inside of the hot work isolation enclosure or the detection of a hazardous atmosphere inside or outside of the enclosure. Manual E-STOP shutdown stations can be staged throughout the hot work perimeter and can provide a manual means of initiating shutdown of all hot work components.

Differential pressure sensors/detectors can be incorporated into the monitoring and control system to measure the differential pressure between ambient outside pressure and the pressure within the interior of the hot work isolation enclosure. Upon the detection of a loss of negative pressure inside of the enclosure, the control system can initiate immediate automatic shutdown of all hot work components in use (e.g. welding machines, gas cutting torches, grinders, work lights, and/or any other spark producing equipment not rated to be intrinsically safe). The monitoring & control system can provide a controlled 110 VAC supply to power non-intrinsically safe tools and equipment, which can be switched off upon any adverse condition during hot work operations.

Atmospheric monitors can be integrated into the hot work isolation enclosure monitoring & control system to monitor the atmosphere inside and outside of the hot work isolation enclosure. A sensor housing unit, such as that described in U.S. Pat. No. 8,947,249 to Dore et al., can be staged at the exhaust outlet of the enclosure and can monitor the air quality inside of the hot work isolation enclosure. As the air exchanges from the interior of the hot work isolation enclosure through the designated exhaust outlet, the sensor housing unit (installed with Class1 DIV1 Atmospheric Monitors: 02-LEL-H2S) measures the status of the atmosphere inside of the hot work isolation enclosure. Upon detection of any condition that is outside of acceptable parameters, the monitoring & control system can initiate a shutdown of all hot work components associated with the hot work isolation enclosure. Other components, such as the air intake blower and/or the air extraction blower, can also be controlled (e.g. shut down and/or started) by the monitoring and control system.

Ventilation:

Intrinsically safe air movers (e.g. blowers) with an 8" outlet provide an air intake supply into the hot work isolation enclosure. Extraction air movers with a 12" outlet are placed downstream of the enclosures (staged in an unclassified location) which perform extraction exhaust from the hot work isolation enclosure. This extraction exhaust is what creates the negative pressure inside of the enclosure. The extraction exhaust air movers (staged in an unclassified location) can be designed to operate in all conditions (during normal operations and during upset) to ensure exhaust ventilation is continuous to prevent the potential of hydrocarbon introduction into the hot work environment. In some embodiments, the outlets on the air intake blower and the air extraction blower can be 8", 12", other sizes, or any combination thereof. In other embodiments, one of the blowers, such as the air intake blower, can be eliminated.

Alternatively, in the event of a release of combustible gas within the enclosure, the monitoring and control system can: 1) cut off the air movers immediately upon the detection of a concentration of combustible gas (thereby sealing the combustible gas within the enclosure and not dumping it into the atmosphere via the extraction air mover); 2) continuing to monitor the concentration of combustible gas within the enclosure after the air movers are shut off; and 3) in the event that the concentration of combustible gas within the enclosure continues to build up and approaches the lower explosive limit of the combustible gas, restarting the air movers and dumping the combustible gas into the atmosphere.

As another alternative, as opposed to turning off both the intake air mover and extraction air mover in response to the detection of a concentration of combustible gas, only the intake air mover can be shut off, while allowing the extraction air mover to continue to run. By doing so the negative pressure atmosphere within the enclosure can be maintained, yet the amount of combustible gas that is dumped into the atmosphere via the extraction air mover is reduced or eliminated. Similar to the example above, in the event that the concentration of combustible gas within the enclosure continues to build up and approaches the lower explosive limit of the combustible gas, the intake air mover can be restarted which can allow the combustible gas to be dumped into the atmosphere.

Furthermore, in response to the detection of a concentration of combustible gas, the negative pressure atmosphere within the enclosure can be maintained while at the same time the amount of combustible gas that is dumped into the atmosphere via the extraction air mover can be reduced or eliminated by other means. For example, the extraction air mover can continue to run while the intake of air into the enclosure is stopped, such as by closing a damper located in a duct between the intake air mover and the enclosure. As another example, in response to the detection of a concentration of combustible gas, the air within the enclosure can continue to be extracted from the enclosure, but can be diverted to another location and stored at that location so that it is not dumped into the atmosphere. This can be accomplished, for example, by an air compressor which compresses the extracted air and pumps it into one or more air storage containers, such as an air storage tank. The air (including any combustible gas) stored within the tanks can then be disposed of in an appropriate manner at an appropriate time.

Atmospheric Monitoring:

A programmable logic controller (PLC) can be incorporated into the monitoring and control system and can be used as a means to gather and process atmospheric data. A gas sensor/detector unit is provided that connects to the PLC system. The gas sensor can generate a 4-20 milliamp signal that can be converted by the PLC to a real number that is used throughout the PLC program to display the instantaneous data value as a real number unit, or as a trend of the real number over a period of time, and displayed on a Human Machine Interface panel (HMI) for viewing in appropriate location(s). The signal from the gas sensor is also used in the PLC program (logic) to perform a safety control function (i.e., oxygen settings for alarm and shutdown 19.5%—low and 23.5% high) to control all associated equipment connected to the PLC system. Atmospheric data such as pressure, oxygen, combustible gas (e.g. lower explosive level (LEL) of combustible gas), carbon monoxide and hydrogen sulfide are some examples of conditions that can be gathered and used in the control system. Based on any set point (shutdown or alarm), the PLC can shut down all desired equipment and/or can activate visual and/or audible alarms. All sensors can be calibrated as per manufacturer procedures and as needed by operator's policies and procedures. All sensors can be calibrated using appropriate calibration gases and techniques. Documentation for calibration of sensors can be provided and placed with each project on location.

Pressure Monitoring/Control:

The hot work isolation enclosure monitoring & control system can monitor the negative pressure inside of the enclosure by means of a DP (differential pressure) sensor and can automatically initiate shutdown of all hot work components upon detection of a pressure rise above an identified set point. By monitoring the negative pressure of the enclosure, it can be ensured, by means of exhaust ventilation and the measurement of negative atmospheric pressure (differential pressure sensors), that any exposure of hydrocarbon release from within the hot work isolation enclosure is evacuated from the hot work area(s) in conjunction with the shutdown functions of the hot work monitoring & control system.

Control:

The PLC system can gather data from the input of various devices, e.g. push/pull emergency stop stations, pressure sensors, atmospheric gas sensors, etc. and can execute an output to various pieces of equipment. This output function can be automatically performed without the need for any person or person's manual control. For example, upon activation of an emergency stop station, the PLC can turn off all outputs to all associated hot work equipment (e.g. welding machines, oxygen/acetylene sources, grinders, work tools, etc.) In an embodiment, the control system can control one, two, three, or more simultaneously operating welding machines and/or oxygen/acetylene sources during hot work operations.

Normal Operations:

All associated hot work apparatuses (e.g. welding equipment) can be controlled and shut down in the event of a platform/rig emergency shutdown, atmospheric condition, loss of negative (or, if desired, loss of positive) pressure inside the enclosure, or activation of the push button hot work ESD (E-STOP).

The control system can be designed to fail in the shutdown mode to shut down associated welding and burning equipment and can be designed to not shut down the platform or rig. With the possible exception of an emergency stop station, the system is ordinarily designed to shut down automatically without the intervention of a worker or other personnel. If conditions dictate, the emergency Stop, E-Stop push to shut stations can be located in the appropriate locations for immediate shutdown and alarm.

Hot Work Isolation Enclosure Materials:

Enclosure materials can be constructed of a solid fire retardant material with additional materials that are rated non-combustible or fire proof.

Installation Techniques:

PRV 1810 Silicone Rubber Flame Resistant Fabric which has been incorporated into a system of flexible, interconnected panels can be used to form the walls, ceiling, and/or floor of the enclosure. The panel system can attach to a frame (e.g. scaffolding) of the enclosure. In an embodiment, the panel system can be located inside of the frame and can be attached to the frame by straps or other suitable devices. In another embodiment, the panel system can be constructed around the outside of the frame so that the panel system essentially encapsulates the frame. In areas where heavy amounts of hot work may be performed, an addition barrier, such as carbon fiber cloth that is rated fire proof (e.g. to 3000 degrees F.), can be installed. Support for the floor or deck is typically the base of a scaffolding system or the deck of the production facility or drilling rig. Support for the deck, walls and ceiling can utilize a metal anchoring system (e.g. scaffolding) that provides strength and is non-combustible. In the event hot work will be conducted near a wall, floor, or ceiling of an enclosure, e.g. less than a 12" distance from a wall of the hot work isolation enclosure, additional barriers can be installed to limit exposure to the enclosure panels. This may be accomplished by installing sheet metal panels on the bulkhead at all areas near where hot work may be conducted. Ordinarily approved materials are to be used as fire resistant barriers. The fire blanket material can be "Panther" (carbon fiber) felt rated 3000 degrees continuous. Prior to the start-up of hot work, a thorough leak test can be conducted by personnel, such as a supervisor, to ensure integrity of the hot work isolation enclosure and to remove any combustible materials in the surrounding work area(s). All areas of the hot work isolation enclosure should be inspected to ensure penetration points, decks and seams are properly sealed to prevent exposure to flammable debris. Personnel, such as a supervisor, can conduct and document a leak test every four hours during hot work operations. Enclosures can be designed for temporary cutting and burning outside of the enclosure and can be dismantled soon after work stoppage.

Hot Work Isolation Enclosure Control System Operator
Roles and Responsibilities:
Perform a visual inspection of the hot work isolation enclosure daily to ensure that integrity is not compromised as per requirements (leak test every four hours)
Serve as an external source of hot work shutdown if external conditions become unfavorable (facility alarms, facility evacuations, etc.)
Ensure all sensing devices are calibrated before work commences near the hot work isolation enclosure
Function testing of all telemetry devices before hot work begins each day (ESD, LEL, O2, CO, H2S and hot work shutdown controls)
Monitor the components of the hot work isolation enclosure control system: ESD, LEL, O2, CO, H2S and hot work shutdown controls
Keep a line of communications between the firewatch personnel regarding control system alarms
Hot Work Isolation Enclosure Technician
Roles and Responsibilities:
Install the hot work isolation enclosure(s) according to proper installation procedures utilizing only approved materials
Ensure all seams (walls, ceilings, floors) and penetrations are properly sealed to maintain 100% integrity for the prevention of potential leak path exposure
Perform a visual inspection of the hot work isolation enclosure daily to ensure that integrity is not compromised (leak test every four hours)
Serve as an external source of hot work shutdown if external conditions become unfavorable (facility alarms, facility evacuations, etc.)
Ensure all sensing devices are calibrated before work commences
Function test all telemetry devices before hot work begins each day (ESD, LEL, O2, CO, H2S and hot work shutdown controls)
Monitor the telemetry system that comprise the hot work isolation enclosure control system (ESD, LEL, O2, CO, H2S and hot work shutdown controls)
Keep a line of communications between the assigned firewatch personnel
Firewatch Attendant Duties:
In areas where hot work is being performed, a primary responsibility of the firewatch is to keep a diligent lookout for sparks, smoke or excessive heat to ensure the prevention of a hot work isolation enclosure leak path which has the potential to result in fire. To prevent distractions, the person on fire watch ordinarily does not have any additional duties. The firewatch personnel is ordinarily trained and knowledgeable in the hot work isolation enclosure process, including: adequate placement of portable fire extinguishers, adequate barriers and materials to prevent exposure of flammable debris coming into contact with the hot work isolation enclosure wall/ceiling/floor panels, communication with welders, fitters or other personnel throughout the hot work process, identification of condition changes, etc. Ordinarily, all firewatch personnel should be familiar with the alarm systems and procedures in the facility, in order to be prepared to respond in the event of an emergency. Additionally, firewatch personnel ordinarily should have firefighting equipment, such as extinguishers and hoses, available and ready to use. The amount of equipment and firewatch personnel ordinarily should be sufficient to cover all hot work being performed. Firewatch personnel ordinarily should also inspect a hot work job site before work begins as well as continuously during shift. During this inspection, all combustible material ordinarily should be removed and a thorough inspection ordinarily should be conducted to ensure no exposure to the escape of flammable debris. Upon completion of hot work, the firewatch ordinarily should remain in the hot work area for a minimum of 30 minutes for a "cool down" period. All areas where sparks or flames have been present ordinarily should be inspected during this period.

Pre-Job Hazard Evaluation & JSEA (Job Safety & Environmental Analysis)

A Pre-Job Hazard Evaluation ordinarily will be conducted to alert personnel of potential hazards while performing tasks, and to recognize and discuss safe working practices to be used. This ordinarily should be reviewed with all personnel involved to ensure all hands understand the task to be performed and know the proper safe procedures. This evaluation should include (but is not be limited to): weather conditions, work surface conditions, proper tool use, electrical safety, simultaneous operations, personal protective equipment ("PPE") use, Slips-Trips-Falls, and any condition that could cause potential injury or damage to equipment.

A pre-job Job Safety & Environmental Analysis ("JSEA") should ordinarily be reviewed by all personnel before work begins. This document ordinarily will describe the work to be performed, list potential hazards that could occur, and recommended safe procedures to prevent damage to personnel, equipment, and the environment. This document ordinarily will be posted on-site with applicable work permits. The JSEA ordinarily will be signed by all workers involved in the tasks to be performed. The JSEA ordinarily will include proper tools & PPE to be used. Ordinarily, no tasks are to be performed unless all parties involved have reviewed a site specific JSEA.

The Pre-Job Hazard Evaluation and the JSEA are tools which can protect the safety of personnel, environment, and equipment. Ordinarily it is the duty and responsibility of each individual to ensure all steps are taken to complete each task in a safe manner. In an embodiment, all personnel have the authority & responsibility to stop any job if there is an unsafe condition.

The above summary is not intended to describe each illustrated embodiment or every possible implementation. The figures and the detailed description which follow exemplify these embodiments.

IV. BRIEF DESCRIPTION OF THE SEVERAL VIEWS OF THE DRAWINGS

Figure 2:
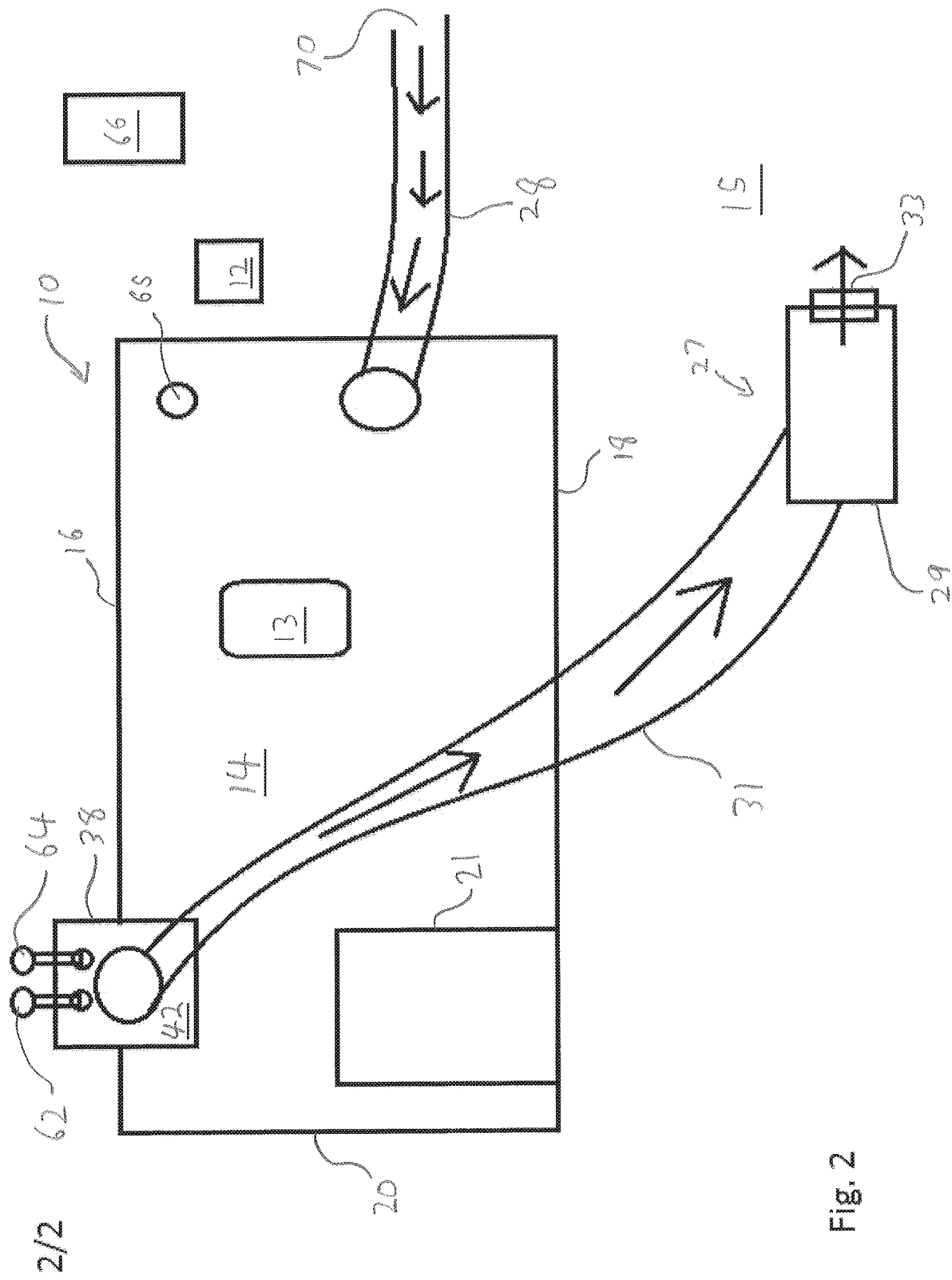

FIG. 1 is a view of an embodiment described herein.
FIG. 2 is a view of an embodiment described herein.

V. DETAILED DESCRIPTION OF THE EMBODIMENTS DEPICTED IN THE DRAWINGS

As required, detailed embodiments of the present invention are disclosed herein. However, it is to be understood that the disclosed embodiments are merely exemplary of the invention, which can be embodied in various forms. As such, any feature(s) used in one embodiment can be used in another embodiment. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "connected" and/or "coupled," as used herein, are defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. As shown in the accompanying drawings, an embodiment is an isolation enclosure and method for conducting hot work. The isolation enclosure and method can be used for a variety of purposes. For example, a potential use of the isolation enclosure includes, but is not limited to, isolating an area which has the potential to release combustible gas from an area in which hot work is conducted.

As shown in FIG. 1, an embodiment can have an enclosure 10. The enclosure 10 can have a plurality of sides that define the interior 14 of the enclosure 10 and that are formed around or enclose a combustible gas releasing structure 13. As used herein, a combustible gas releasing structure is a structure which has the potential to release combustible gas. Combustible gas releasing structures can include, but are not limited to, well head production valves, pipes or tanks that have the potential to contain or release combustible gas, and other structures that have the potential to contain or release combustible gas. As used herein, combustible gas includes, but is not limited to, hydrocarbons.

Also shown in FIG. 1 is a hot work apparatus 12 that is operable outside of but near to, adjacent to, or in the vicinity of the enclosure 10. In an embodiment, hot work distances from the enclosure 10 can vary for each application. In an embodiment, a typical distance from the enclosure 10 that hot work would be conducted is 5 feet-50 feet, although in certain situations a closer distance may be desired (e.g. when conducting hot work on a skid within less than 5 feet from the combustible gas releasing structure that has been enclosed). In an embodiment, hot work is considered to be conducted within the vicinity of the enclosure 10 if the hot work is conducted within a distance in which combustible gas released from a combustible gas releasing structure within the enclosure would have the reasonable potential to migrate to the hot work in a concentration sufficient to potentially ignite, if the enclosure 10 were not present.

The sides of the enclosure 10 can include ceiling 16, floor 18, and walls 20. The enclosure can also include a door 21 that can allow for the entry into and the exit from the enclosure 10. The sides of the enclosure 10 can be made of materials such as a series of interconnected flame resistant flexible panels, wood, flame resistant plywood, fabric, metal, fiberglass, and/or any other suitable materials. In an embodiment, sides, such as the floor and/or walls, can be a series of interconnected flame resistant flexible panels that is lined on the exterior side with sheet metal, such as aluminum or steel sheet metal. As opposed to or in addition to sheet metal, the sides can be lined with one or more welding blankets. An example of a welding blanket is sold as item number CF16 under the trademark PANTHERFELT. In an embodiment, the enclosure 10 can be formed at locations such as a work site, a petroleum plant, a chemical plant, a pipeline and/or a production platform. In an embodiment, a production platform can be a drilling rig that drills for flammable materials, such as a drilling platform that drills into the earth for hydrocarbons. The enclosure 10 can also be formed at other locations, such as any location where it could be desirable to permanently or temporarily isolate within the enclosure 10 a combustible gas releasing structure 13. A scaffolding framework can be formed around the enclosure 10 or within the enclosure 10 such that the scaffolding framework provides support for the enclosure 10 and secures the position of the enclosure 10. The scaffolding framework can be made of materials such as wood, metal, plastic or any other suitable materials. In an embodiment, the scaffolding framework can be made of fire retardant wooden two-by-fours and/or conventional metal scaffolding.

In an embodiment, the enclosure 10 can be formed to enclose/encapsulate within the enclosure flammable materials, such as hydrocarbons contained in tanks, pipes or other structures. Hot work 12 can be conducted outside of the enclosure 10 and near to, adjacent to, or otherwise in the vicinity of the enclosure so that the flammable materials are isolated from the hot work. Hot work is work that produces a source of ignition, such as arcs, sparks or flames. The hot work 12 can be conducted near to, adjacent to, or otherwise in the vicinity of the enclosure 10 by apparatus such as an arc welder, mig welder, tig welder, cutting torch, grinder, analyzing equipment, spectrometer and/or other apparatuses which can produce a source of ignition.

The sides of the enclosure 10 can have openings that allow objects, such as pipes, decking, cables or other objects to pass through the sides of the enclosure 10. The openings can be formed by cutting the opening into a side of the enclosure 10 when the enclosure 10 is being formed, by forming the sides of the enclosure around such objects, or by using pre-fabricated panels that are designed to allow objects to pass through while also providing a seal to the object. Remaining gaps, if any, between the sides of the enclosure 10 and the object can be sealed with a material such as fire resistant caulk or metal tape.

In an embodiment, a negative pressure atmosphere is within the interior 14 of the enclosure 10. The negative pressure atmosphere can be produced within the enclosure 10 by, for example, transferring air from the interior 14 of the enclosure 10 to the exterior 15 of the enclosure 10. The negative pressure atmosphere can also be produced within the enclosure 10 by transferring air from the interior 14 of the enclosure 10 to the exterior 15 of the enclosure 10 at a rate that is faster than air is allowed to enter the enclosure 10. In the embodiment depicted in FIG. 1, air is transferred from the exterior of the enclosure 10 to the interior 14 of the enclosure 10 by an enclosure air intake blower assembly 25, which can include enclosure air intake blower 26. Air is transferred from the interior 14 of the enclosure 10 to the exterior of the enclosure 10 by an enclosure air extraction blower assembly 27, which can include enclosure air extraction blower 29. The blowers 26 and 29 can be any device that is capable of producing a flow of air, such as a fan, a ducted fan, a compressed air source, such as an air compressor and/or a compressed air tank, an air pump and/or any other suitable device. In an embodiment, the blowers 26 and 29 can be electric, hydraulic or pneumatic blowers. An example of a blower is an Air MAX-12, produced by COPPUS. In the embodiments depicted in FIG. 1, blower 26 is in fluid communication with the interior 14 of the enclosure 10 by way of duct 28, and blower 29 is in fluid communication with the interior of the enclosure 10 by way of duct 31. Air intake 30 of blower 26 can be located at an area believed to be free of combustible gases, such as an unclassified area of a drilling platform. Air output 33 of blower 29 can be located at an area where it is believed to be safe to release combustible gases, such as an unclassified area of a drilling platform. In operation, air is transferred from the exterior of the enclosure 10 to the interior 14 of the enclosure 10 by passing through air intake 30 traveling through duct 28 and into the enclosure 10. In an embodiment, air is transferred from the interior 14 of the enclosure 10 to the exterior of the enclosure 10 by being transferred into the interior 42 of the sensor housing 38 (which can be fluidly connected to the interior 14 of the enclosure 10 via a duct or other air passageway), and then from the interior 42 of the housing 38 through duct 31. After passing through duct 31, the air passes through blower 29 and is dumped or released into the atmosphere exterior of the enclosure 10.

Referring to the embodiment depicted in FIG. 1, detectors 62, and 64 are located exterior of the enclosure 10. Detectors 62 and 64 are in detecting communication with the interior 14 of the enclosure 10, and are located so as to be capable of detecting the presence of a condition within the interior 14 of the enclosure 10. In another embodiment, detectors can be located within the enclosure (in which case the detectors would also be located so as to be capable of detecting the presence of a condition within the interior 14 of the enclosure 10), at the intake of blower 26, at the output of blower 29, or at any other location inside or outside of the enclosure 10 in which it may be desirable to have a detector. Some of, or all of, such detectors may be in wired or wireless communication with a controller 66, such as a programmable logic controller. In an embodiment, the presence of a condition can include detecting conditions such as a level of toxic gas, a level of combustible gas, a level of oxygen, a level of carbon monoxide, a level of hydrogen sulfide and/or other gases. The presence of a condition can also include detecting conditions such as a level of pressure, humidity, temperature and/or any other condition. In an embodiment, detector 62 is a combustible gas detector and detector 64 is an oxygen detector. As an example, the detectors can be mechanical, solid-state, chemical, electrochemical, electric, optical, infrared, photoionization, catalytic bead and/or any other type of detector. Depending on the detectors selected, the detectors can perform the detection function in various ways, for example by air sampling, pressure sensing, light absorption or any other way.

As shown in FIGS. 1 and 2, an embodiment can include a pressure detector 65, such as a differential pressure sensor. The pressure detector 65 can be used, for example, to measure the differential pressure between the ambient air pressure outside of the enclosure 10 and the pressure within the interior 14 of the enclosure 10. By doing so, the pressure detector 65 can be used to determine whether a negative pressure atmosphere exists within the interior 14 of the enclosure 10.

The controller 66 can be in communication, such as wired or wireless communication, with various components. For example, the controller can be in communication with one or more of the following: hot work apparatuses such as hot work apparatus 12; detectors such as detectors 62, 64, and 65; blowers such as blowers 26 and 29; emergency shutdown switches, facility monitoring and control systems, alarms, and/or other components.

In an embodiment, one or more detectors can be located so as to detect the presence of a condition in or near to the air intake 30 of the blower 26. One or more detectors can also be located so as to detect the presence of a condition in or near to the air output 33 of the blower 29. In an embodiment, a combustible gas detector, an oxygen detector, a carbon monoxide detector and a hydrogen sulfide detector can be located so as to detect the presence of a condition in or near to the air intake 30 of the blower 26, or in or near the air output 33 of the blower 29. In addition, an oxygen detector, a carbon monoxide detector, a hydrogen sulfide detector and a pressure detector can be in detecting communication with the interior 14 of the enclosure 10.

Referring to FIG. 2, in an embodiment, the air intake blower (shown as 26 in FIG. 1) can be eliminated. The end opening 70 of duct 28 can be located in an area believed to be free of combustible gas, such as an unclassified area of a drilling platform. Blower 29 can be used to transfer air from the interior 14 of the enclosure 10 to the exterior of the enclosure 10, thus producing a negative pressure atmosphere within the interior 14 of the enclosure 10. In this embodiment (as well as the embodiment depicted in FIG. 1), the flow of air through the system is depicted by the arrows shown within ducts 28 and 31.

In operation of an embodiment, an enclosure 10 is formed around an area that is desired to be isolated, such as combustible gas releasing structure 13, and the remaining components of the system (e.g. detectors, blowers, controllers, hot work apparatuses, etc.) are installed. Blowers 26 and/or 29 are turned on, thus creating a flow of air through the system. In the embodiment depicted in FIG. 1, air flows through air intake 30, then through blower 26, then through duct 28, then into the interior 14 of enclosure 10, then from there into the interior 42 of housing 38, then from there through duct 31, then through blower 29, and then the air is dumped or released into the atmosphere exterior of the enclosure (or, in some embodiments, rather than being released into the atmosphere, the air can be stored in a container for later removal, disposal, or release). In the embodiment depicted in FIG. 2, air flows through end opening 70, then through duct 28, then into the interior 14 of enclosure 10, then from there into the interior 42 of housing 38, then from there through duct 31, then through blower 29, and then the air is dumped or released into the atmosphere exterior of the enclosure (or, in some embodiments, rather than being released into the atmosphere, the air can be stored in a container for later removal, disposal, or release).

While air is flowing through the system, hot work, via hot work apparatus 12, can be conducted outside of and adjacent to the enclosure 10. During this process, detector 62 monitors for the presence of combustible gas within the interior 14 of the enclosure 10 (which, in this embodiment, is accomplished by detecting the level of combustible gas in the air within the interior 42 of the housing 38—which is air that has been transferred from the interior 14 of enclosure 10 to the interior 42 of housing 38). The combustible gas detector can be programmed to generate a signal in the event that combustible gas is detected, and/or in the event that the level of combustible gas reaches a predetermined level. In a similar manner, detector 64 monitors the level of oxygen within the interior 14 of the enclosure 10, and can be programmed to generate a signal in the event that the level of oxygen falls outside of a predetermined range.

Also during this process, pressure detector 65 can monitor the differential pressure between the atmosphere within the interior 14 of the enclosure 10 and that atmosphere outside of the enclosure 10. By monitoring the differential pressure, it can be determined whether a negative pressure atmosphere exists within the interior 14 of the enclosure 10. The pressure detector 65 can be programmed to generate a signal in the event that an adverse pressure condition is detected, such as the loss of the negative pressure atmosphere within the interior 14 of the enclosure 10 (which could happen, for example, if the sides of the enclosure 10 are breached or the blower(s) stop operating).

In the event that an adverse condition is detected by one of the detectors, the detector generates a signal which is communicated to the controller, 66. In response to this signal, the controller 66 can shut down the hot work apparatus 12. In some embodiments, in response the signal, the controller 66 can also shut down blower 29 and blower 26.

In other embodiments, in response to the signal, the controller 66 can shut down blower 26 (if present), but allow blower 29 to continue running. In still other embodiments, in response to the signal, the controller 66 can allow both blower 29 and blower 26 to continue running.

In yet another embodiment, in response to a signal generated by the combustible gas detector 62 indicating the presence of combustible gas has been detected within the interior 14 of the enclosure 10, the controller 66 can shut down blower 29 and blower 26 (if present). The controller 66 can then restart the blower(s) in the event that the level of combustible gas within the interior 14 of the enclosure 10 reaches a predetermined level, such as a level that is at or approaching the lower explosive limit of the combustible gas (which could potentially create a dangerous condition within the interior 14 of the enclosure 10). By doing so, in the event that combustible gas is released within the enclosure 10, the combustible gas can be safely contained within the enclosure 10 for a period of time, but the combustible gas can then be evacuated from the enclosure 10 if the level of combustible gas within the enclosure 10 approaches the lower explosive limit of the combustible gas.

In operation on an embodiment, such as the embodiment depicted in FIG. 2, the hot work apparatus 12 is automatically shut down in the event that detector 62 detects the presence of combustible gas, or in the event that detector 64 detects a level of oxygen that falls outside of a predetermined range. The hot work apparatus 12 is also automatically shut down in the event that the pressure detector 65 detects the loss of the negative pressure atmosphere with the interior 14 of the enclosure 10. By doing so hot work can be safely conducted in areas adjacent to combustible gas releasing structures, but the hot work can be automatically stopped in the event that combustible gas is actually released from the combustible gas releasing structure.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

We claim:
1. A method of conducting hot work comprising:
   a. producing a negative pressure atmosphere within an interior of an enclosure;
   b. monitoring for the presence of combustible gas within the interior of the enclosure;
   c. conducting hot work outside of and adjacent to the enclosure;
   d. shutting down the hot work in the event that the presence of combustible gas is detected within the interior of the enclosure; and
   e. shutting down the hot work in the event of a loss of the negative pressure atmosphere within the interior of the enclosure.
2. A method of conducting hot work comprising:
   a. producing a negative pressure atmosphere within an interior of an enclosure, wherein said producing a negative pressure atmosphere within the interior of the enclosure further comprises transferring air from the interior of the enclosure to the exterior of the enclosure;
   b. monitoring for the presence of combustible gas within the interior of the enclosure;

c. conducting hot work outside of and adjacent to the enclosure;
d. shutting down the hot work in the event that the presence of combustible gas is detected within the interior of the enclosure;
e. stopping said transferring air from the interior of the enclosure to the exterior of the enclosure in the event that the presence of combustible gas is detected within the interior of the enclosure;
f. continuing said monitoring for the presence of combustible gas within the interior of the enclosure; and
g. restarting said transferring air from the interior of the enclosure to the exterior of the enclosure in the event that a level of combustible gas within the interior of the enclosure reaches a predetermined level.

3. A method of conducting hot work comprising:
a. producing a negative pressure atmosphere within an interior of an enclosure, wherein said producing a negative pressure atmosphere within the interior of the enclosure further comprises transferring air from the interior of the enclosure to the exterior of the enclosure; and wherein said transferring air from the interior of the enclosure to the exterior of the enclosure further comprises storing the air transferred from the interior of the enclosure to the exterior of the enclosure in a container;
b. monitoring for the presence of combustible gas within the interior of the enclosure;
c. conducting hot work outside of and adjacent to the enclosure; and
d. shutting down the hot work in the event that the presence of combustible gas is detected within the interior of the enclosure.

4. A method of conducting hot work comprising:
a. producing a negative pressure atmosphere within an interior of an enclosure;
b. monitoring for the presence of combustible gas within the interior of the enclosure;
c. conducting hot work outside of and adjacent to the enclosure;
d. shutting down the hot work in the event that the presence of combustible gas is detected within the interior of the enclosure; and
e. forming the enclosure around a combustible gas releasing structure.

* * * * *